United States Patent [19]

Takahashi

[11] Patent Number: 5,658,105

[45] Date of Patent: Aug. 19, 1997

[54] SPLASH GUARD FOR MACHINE TOOL

[75] Inventor: Hiroyuki Takahashi, Ichinomiya, Japan

[73] Assignee: Brother Kogyo Kabushiki Kaisha, Aichi-ken, Japan

[21] Appl. No.: 540,555

[22] Filed: Oct. 6, 1995

[30] Foreign Application Priority Data

Oct. 7, 1994 [JP] Japan .................................. 6-270520

[51] Int. Cl.⁶ ............................................ B23Q 11/08
[52] U.S. Cl. ................................. 409/134; 29/DIG. 56; 74/608; 451/455; 408/241 G
[58] Field of Search ...................... 408/234, 241 G; 409/134, 135, 136; 29/DIG. 56; 74/608; 451/451, 455

[56] References Cited

U.S. PATENT DOCUMENTS

| | | | |
|---|---|---|---|
| 4,742,609 | 5/1988 | Neumann | 409/135 |
| 4,863,319 | 9/1989 | Winkler et al. | |
| 5,342,156 | 8/1994 | Baba | 409/134 |
| 5,364,210 | 11/1994 | Rutschle | 409/134 |

OTHER PUBLICATIONS

Japanese Patent Publication No. HEI-4-26974 published on May 8, 1992*.

*Primary Examiner*—Daniel W. Howell
*Attorney, Agent, or Firm*—Kane, Dalsimer, Sullivan, Kurucz, Levy, Eisele and Richard, LLP

[57] ABSTRACT

Two opposing and parallel resilient wipers contact and wipe a top surface of a panel rotating about an axis perpendicular to the length of the wipers. The panel separates exchanger platforms of a rotatable turntable for exchanging workpieces between a loading station and a machining station. Each wiper is split near the center to follow the top surface of the panel as it rotates, and the splits are offset from each other along the lengthwise direction such that debris or fluid entering one of the slits will be stopped by an opposing face of the remaining wiper.

19 Claims, 7 Drawing Sheets

SPLASH GUARD FOR MACHINE TOOL

BACKGROUND OF THE INVENTION

The present invention relates to splash guards for machine tools, and more particularly, to splash guards for workpiece turntables used in machining tools.

A turntable having a pair of workpiece exchanging sub platforms, diametrically opposite, that can be rotated between positions for loading or machining. Conventionally, a panel is provided in the center of such a table to prevent the escape of debris and cutting fluid from the article undergoing machining. A splash guard is conventionally provided about the periphery of such a panel.

Japanese Patent Publication HEI 4-26974 discloses one such splash guard. As shown in FIG. 1, this conventional splash guard includes a panel 62 fixed to a turntable 60. The panel 62 divides the turntable 60 into symmetrical exchanging platforms 60a, 60b, which can be rotated between a machining station 71 and a loading station 72. The rotating turntable 60 is positioned in an opening 63a of a partition 63, and can rotate such that the panel 62 aligns with the partition 63 when the either platform 60a or 60b faces the machining station 71. The opening 63a is larger than the panel 62 so that a gap is provided between for allowing the rotation of the panel 62 within the opening 63a. Left and right flaps 65a, 65b, made of metal or acrylic, are provided to shield the debris or cutting fluid through a Gap between the top end of the panel 62 and the opening 63a.

FIG. 2 is a side sectional view of the left and right flaps 65a and 65b, as taken along D—D in FIG. 1. As shown in FIG. 2, a plate 66 is fixed to the partition 63, extending toward the panel 62. The plate 66 supports left and right flaps 65a and 65b. The left and right flaps 65a and 65b, overlap the opposite faces of the panel 62, acting as a splash guard.

If the turntable 60 is rotated counterclockwise (direction CC) in order to switch platforms, as shown in FIG. 1, then the panel 62 rotates away from the flaps 65a, 65b, eventually contacting the opposite sides of the flaps 65a, 65b again, and again acting as a splash guard. A clearance 65c between the flaps 65a and 65b is necessary to achieve this operation (the flaps 65a, 65b must be pushed in opposite directions by the panel 62).

Debris and cutting fluid tends to escape through the clearance 65c into the loading station 72. Thus, the machining station 71 is not completely isolate. Furthermore, contact between the hard metal or acrylic flaps 65a, 65b and the panel 62 causes noise and a high wear rate of the flaps 65a, 65b.

SUMMARY OF THE INVENTION

It is therefore an object of the present invention to provide an improved splash guard for a rotatable panel wall and turntable of a machine tool that completely prevents the escape of debris and fluid. It is a further object of the invention to extend the life of such a splash guard.

In order to achieve the objects of the invention, an improved splash guard for a machine tool includes: a rotatable horizontal turntable for rotating and exchanging a workpiece between a loading and a machining station of the machine tool; a vertical panel perpendicularly fixed to the turntable to rotate with the turntable, the panel separating the turntable into two exchanger platforms rotatable between the loading and machining stations to exchange the workpiece; a vertical partition surrounding the panel for separating the loading station from the machining station, wherein the panel is rotatable to align with the partition and to form a gap between a top surface of the panel and an internal horizontal surface of the partition when aligned; and at least two resilient wipers fixed to the partition, each of the resilient wipers extending across the gap, parallel to one another and facing one another, and both of the resilient wipers being capable of simultaneously resiliently contacting the entire length of the top surface of the panel to seal the gap.

Accordingly, the use of parallel wipers ensures that debris or fluid is unable to pass through the gap, as any material that passes the first is surely stopped by the second. Furthermore, since the wipers resiliently contact the top surface of the panel, the operation is quiet and the seal is good. Preferably, each of the resilient wipers is vertically divided near a center portion thereof into two portions by a split extending towards the top surface of the panel. The splits are horizontally offset from each other along the length of the resilient wipers, so that each split is opposite a blocking face of the opposing resilient wiper. The splits allow the wipers to freely resiliently wipe the top surface of the panel according to the direction of rotation. As the splits are offset from each other, any debris or fluid passing through a split in one wiper is certainly blocked by the opposing face of the remaining wiper.

The axis of rotation of the panel is preferably coplanar with the partition, and perpendicular to the internal horizontal surface of the partition. In this case, the sweep of the panel is perpendicular to the direction in which the wipers extend towards the panel, providing the most constant contact force and wiping when the partition and panel are aligned.

According to another aspect of the invention, a splash guard for a machine tool includes: a vertical stationary partition having a rectangular opening formed therein, the rectangular opening having an internal horizontal surface and internal vertical surfaces; a vertical rotatable panel having a rotation axis coplanar with the stationary partition and perpendicular to the internal horizontal surface, the rotatable panel having a top surface parallel to and forming a gap with the internal horizontal surface; a first resilient wiper fixed to the internal horizontal surface; and a second resilient wiper fixed to internal horizontal surface, parallel to and facing the first resilient wiper, wherein both of the first and second resilient wipers extend across the entire length of the internal horizontal surface and across the gap, and are capable of resiliently contacting the top surface of the panel to seal the gap.

In this manner, the first resilient wiper serves to block any material passing the second wiper, and vice versa. As the sweep of the panel is perpendicular to the direction in which the wipers extend towards the panel, as the rotating panel rotates to align with the partition, the most constant contact force and wiping are created.

Preferably, each of the first and second resilient wipers is vertically divided near a center portion thereof into two portions by a split extending toward the top surface of the panel. The splits are horizontally offset from each other along the length of the wipers, so that each split is opposite a blocking face of the facing wiper. The splits allow the wipers, resiliently contacting the top surface of the panel, to bend in the direction of rotation, and to resiliently wipe the top surface of the panel according to the direction of rotation. As the splits are offset from each other, any debris or fluid passing through a split in one wiper is certainly blocked by the opposing blocking face of the remaining wiper.

According to still another aspect of the invention, a splash guard includes: a partition separating a first and second area of the machine tool, and having a rectangular opening formed therein; a rectangular panel provided in the rectangular opening, the rectangular panel being rotatable within the rectangular opening; a pair of wiper members, opposing each other and blocking the opening from the partition to the rectangular panel, each of the wiper members being split to allow the rectangular panel to rotate, and the splits being offset from each other so that each of the splits is blocked by an unsplit portion of the opposing wiper. Accordingly, any debris or fluid through the opening from the partition to the rectangular panel is blocked by the wipers. Although the splits may admit debris or fluid, as each of the splits is blocked by an unsplit portion of the opposing wiper, any debris or fluid passing through a split in one wiper is certainly blocked by an unsplit portion of the remaining wiper.

DESCRIPTION OF THE ACCOMPANYING DRAWINGS

DESCRIPTION OF THE EMBODIMENTS

Figure 1:
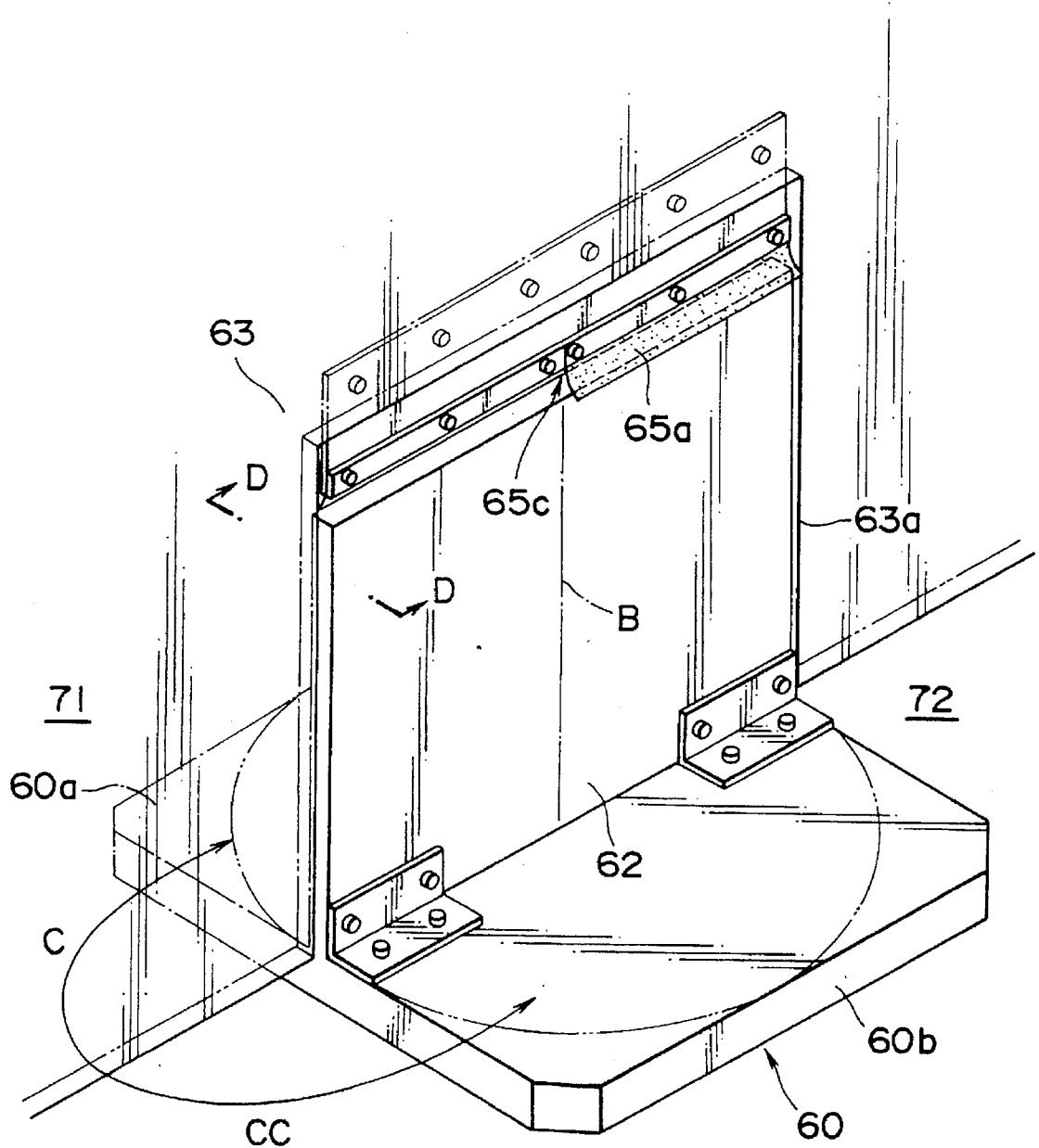
FIG. 1 is a perspective view of a conventional splash guard.
Figure 2:
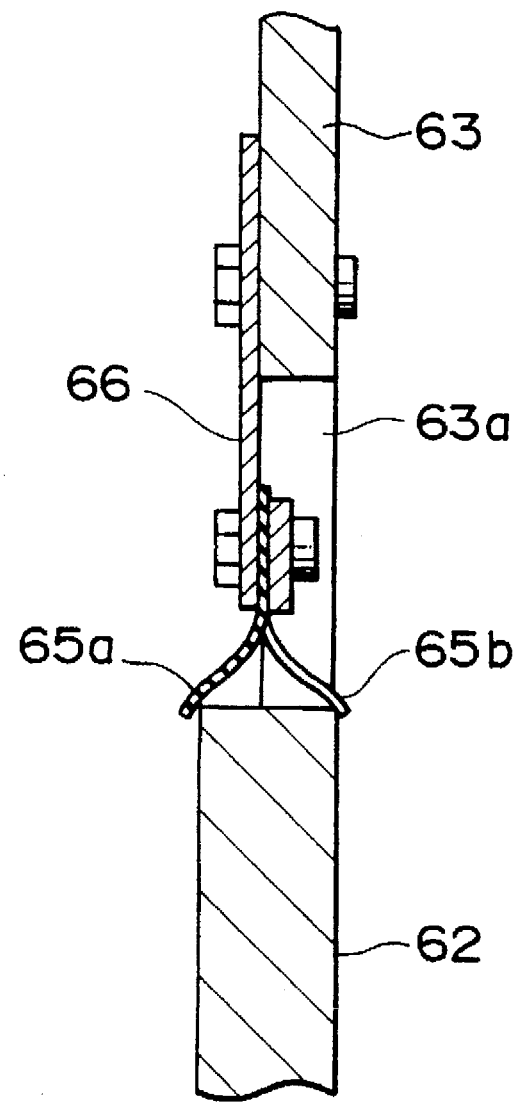
FIG. 2 is a side sectional view of a conventional splash guard, from the view point denoted by the section line D—D of FIG. 1.
Figure 3:
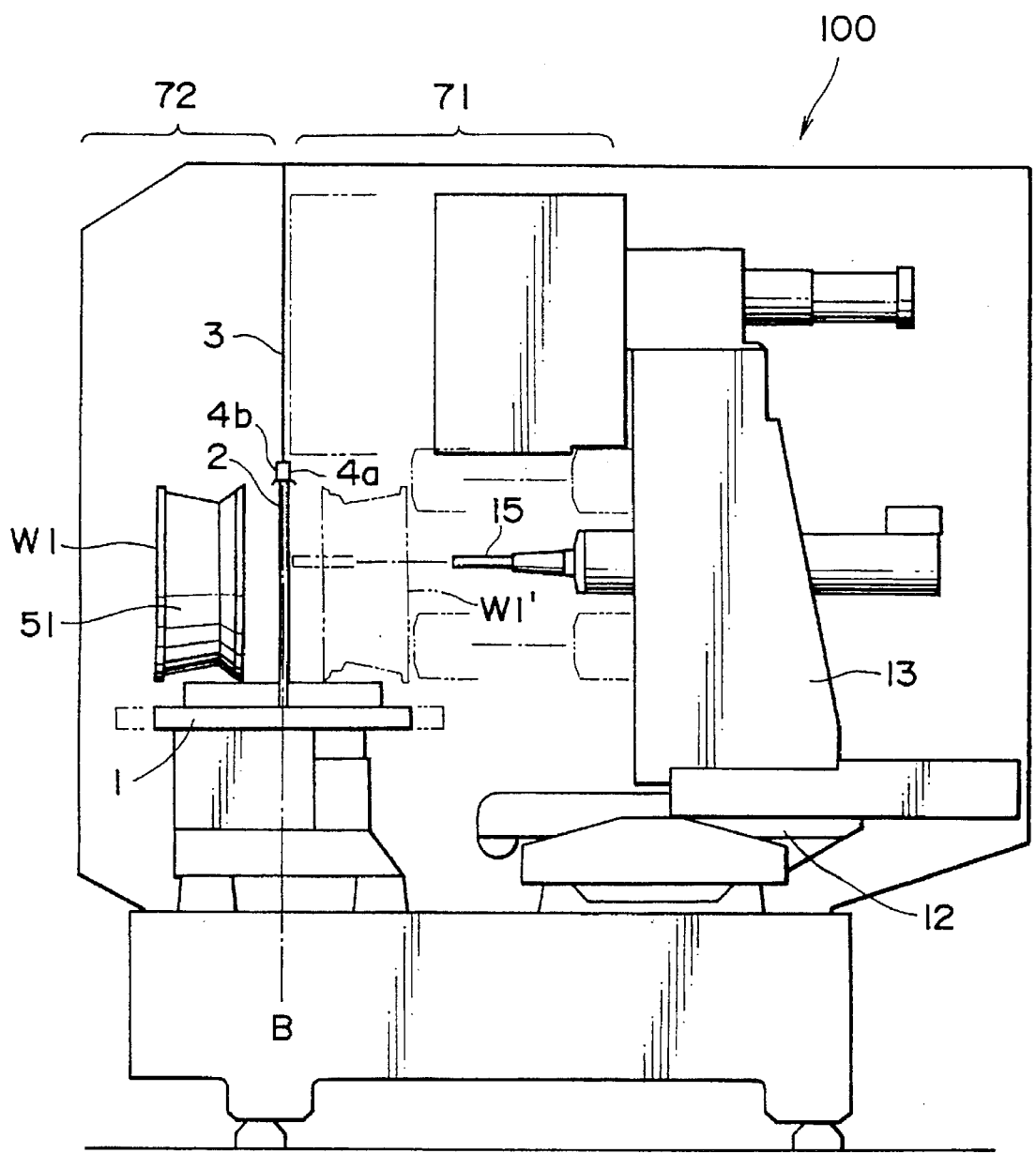
FIG. 3 is a schematic view of a machining station to which the splash guard of the present invention is applied.

FIG. 3 shows a schematic view of a machine tool 100 to which an embodiment of a splash guard according to the invention is applied. The machine tool 100 has a tool head 15 supported on a column 13. The column 13 is movable toward and away from a workpiece 51 on a carriage 12. A partition 3 separates the machining station 71 from the loading station 72. A rotatable turntable 1 rotates a workpiece from the loading station 72 (the workpiece shown in solid lines in position W1) to the machining station 71 (later workpiece position W1', shown by a phantom line) and back. The rotating turntable 1 is positioned in a rectangular opening 3a formed in the partition 3. A panel 2 fixed to the rotatable turntable 1 generally isolates the machining station 71 when the panel 2 is aligned with the partition 3. The panel 2 is a flat rectangular plate, having front and rear faces and narrow, long surfaces on the top and sides. The rectangular opening 3a is larger than the panel 2 so that a gap is provided between the panel 2 and the partition 3 for allowing the rotation of the panel 2 within the opening 3a. The top surface of the panel 2 faces an internal horizontal surface of the partition's rectangular opening 3a, while the side surfaces face internal vertical surfaces of the partition's rectangular opening 3a. The panel 2 separates the turntable 1 into two exchanger platforms able to rotate and exchange workpieces between the positions W1 and W1' as shown. In this case, the front and rear faces of the panel 2 face the positions W1 and W1'. The panel 2 may be made of a transparent material so that the workpiece at position W1' (that is, in the machining station 71) may be viewed.

Figure 4:
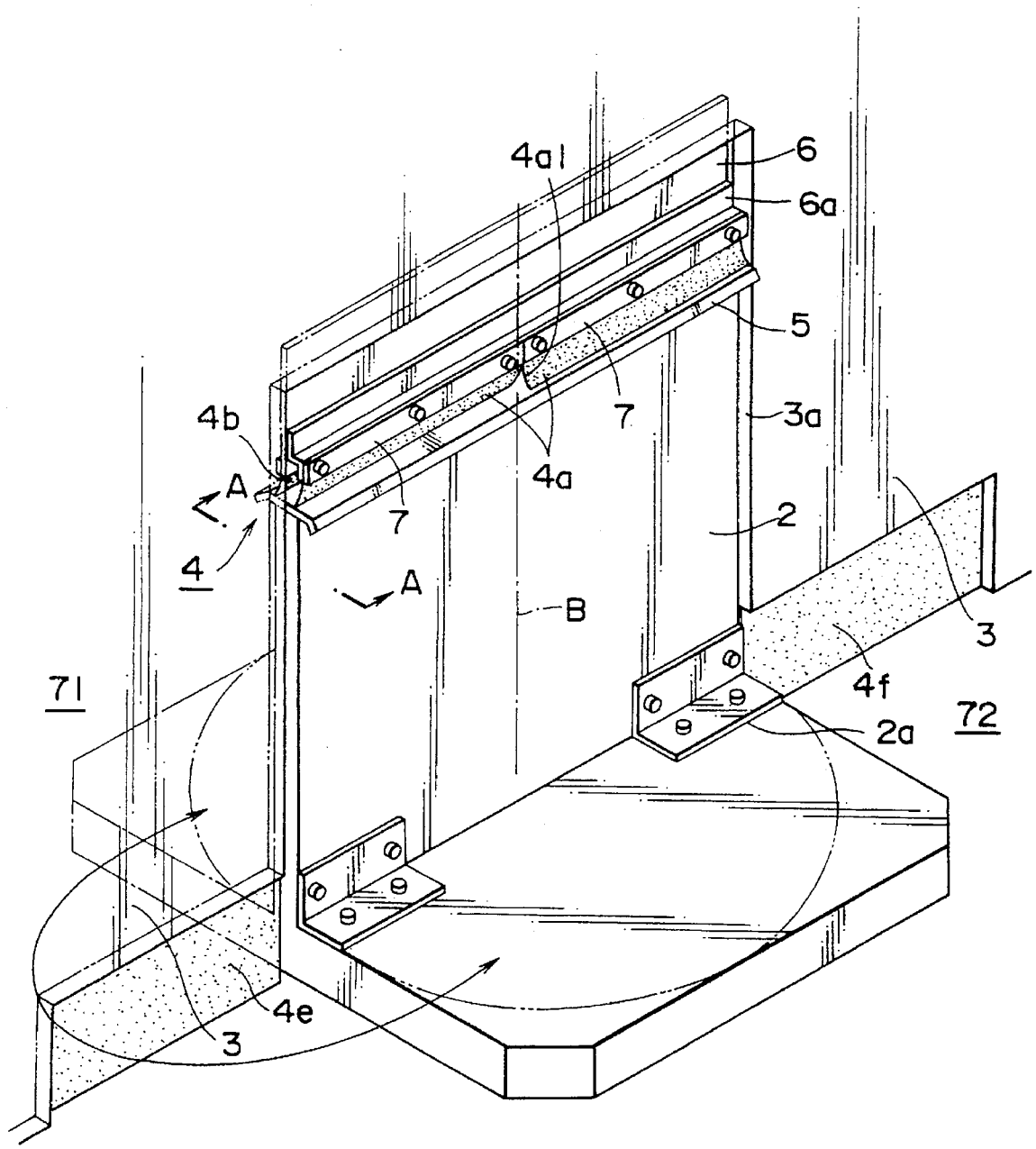
FIG. 4 is a perspective view of an embodiment of a splash guard according to the invention.

FIG. 4 is a perspective view of the turntable 1 employing the embodiment of a splash guard 4 according to the invention. As shown in FIG. 4, the turntable 1 may be rotated by a motor (not shown) about the axis B, between positions where the panel 2 is aligned with the partition 3.

Figure 5:
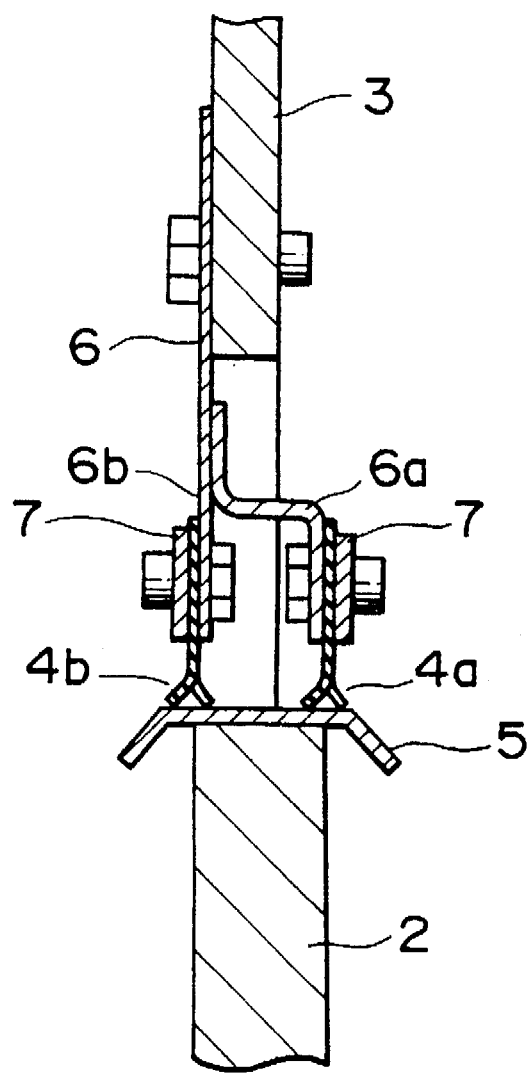
FIG. 5 is a side sectional view of the embodiment of a splash guard according to the invention, from the view point denoted by the section line A—A of FIG. 4.

FIG. 5 is a side sectional view of the splash guard 4, as taken along A—A in FIG. 4. As shown in FIGS. 4 and 5, a bifurcating plate 6 extends toward the panel 2, and divides into two parallel arms, a front arm 6a and rear arm 6b. In this case, the rear arm 6b is integral with the main body of the bifurcating plate 6, while the front arm 6a is an attached S-bent plate. The front arm 6a supports a resilient front wiper 4a, while the rear arm 6b supports a resilient rear wiper 4b, parallel to and facing the front wiper 4a.

Figure 6:
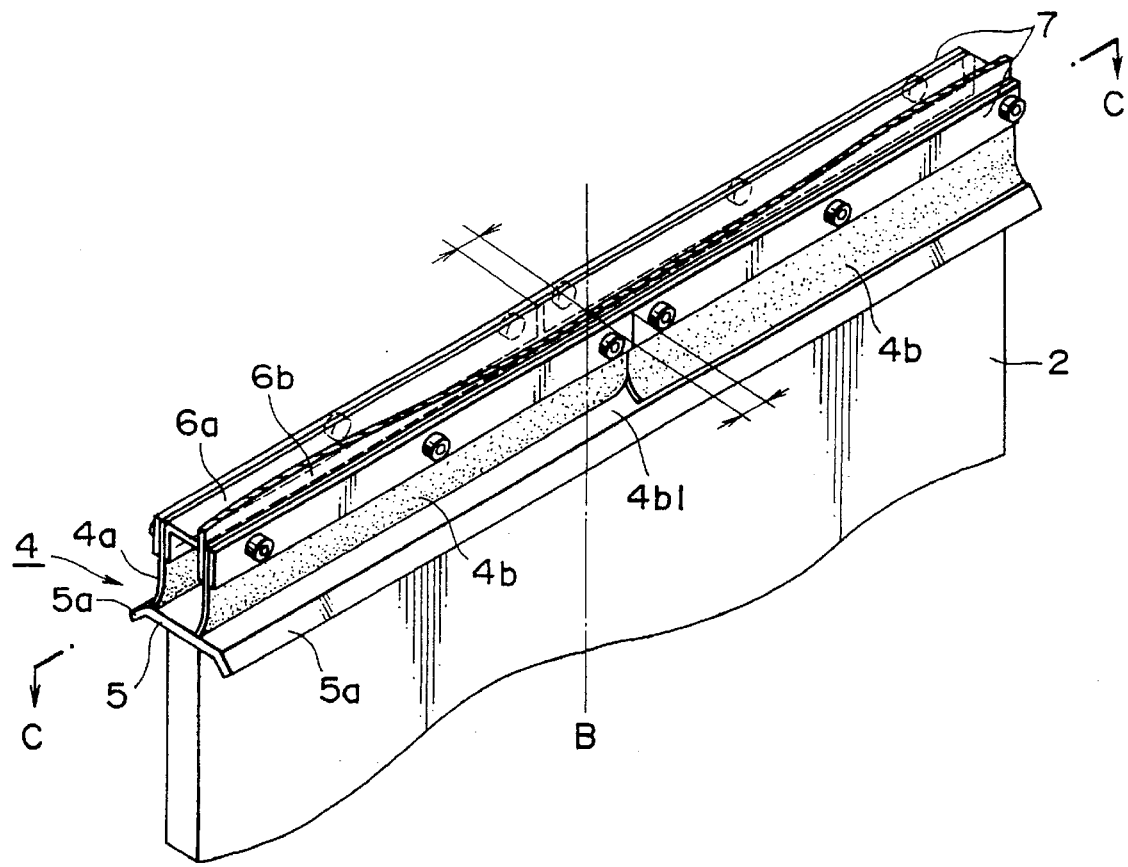
FIG. 6 is an enlarged perspective view of a top portion of the embodiment of a splash guard according to the invention.
Figure 7:
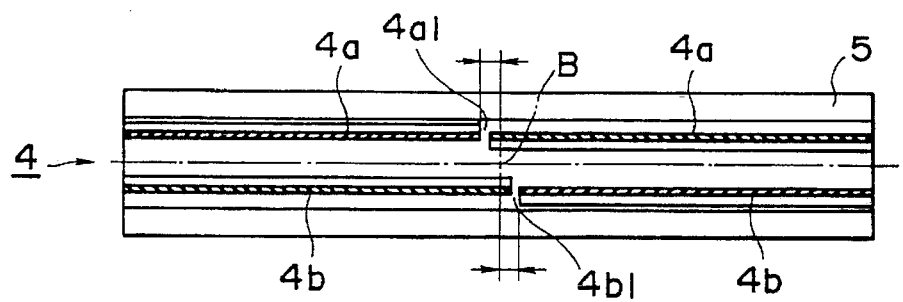
FIG. 7 is a top sectional view of the embodiment of a splash guard according to the invention, from the view point denoted by the section line C—C of FIG. 6.

FIG. 6 shows an enlarged perspective view of the bifurcating plate 6 and the wipers 4a and 4b. FIG. 7 is a top section, taken along C—C of FIG. 6, directly looking down toward the top surface of the panel 2, and showing the bifurcating plate 6 and the wipers 4a and 4b. As shown in FIGS. 6 and 7, the front wiper 4a is divided into left and right portions across its width at a split 4a1, and the rear wiper 4b is similarly divided into left and right portions at a split 4b1. The splits 4a1 and 4b1 allow the wipers 4a and 4b, resiliently contacting the top surface of the panel 2, to bend in the direction of rotation, and to resiliently wipe the top surface of the panel 2 according to the direction of rotation. The wipers 4a and 4b are arranged such that the rotating axis B of the turntable 1 is near the longitudinal center of the front and rear wipers 4a and 4b.

The splits 4a1 and 4b1 of the wipers 4a and 4b are arranged to be staggered with reference to each other, and with reference to the rotation axis B. In this manner, any debris or fluid passing through a split 4a1 or 4b1 is stopped by a blocking face of the opposing wiper. A roof plate 5, wider than the distance between the wipers 4a and 4b, is arranged at the top of the panel 2. The resilient wipers 4a and 4b contact the roof plate 5 and are resiliently deformed at the contacting portions, sealing the opening 3a between the roof plate 5 and partition 3. The roof plate 5 has sloped faces 5a, 5a to allow the wipers 4a and 4b, which extend past the horizontal roof plate. When the panel 2 rotates, the wipers 4a and 4b smoothly contact the top surface of the roof plate 5 and easily deform by a small amount. The lengths of the wipers 4a and 4b are set to keep the amount of deformation small. In this case, the roof plate 5 is attached to the panel 2. However, the roof plate 5 may be unitarily formed with the panel 2; that is, the top surface of the panel 2 may be shaped as and serve as the roof plate 5.

Figure 8:
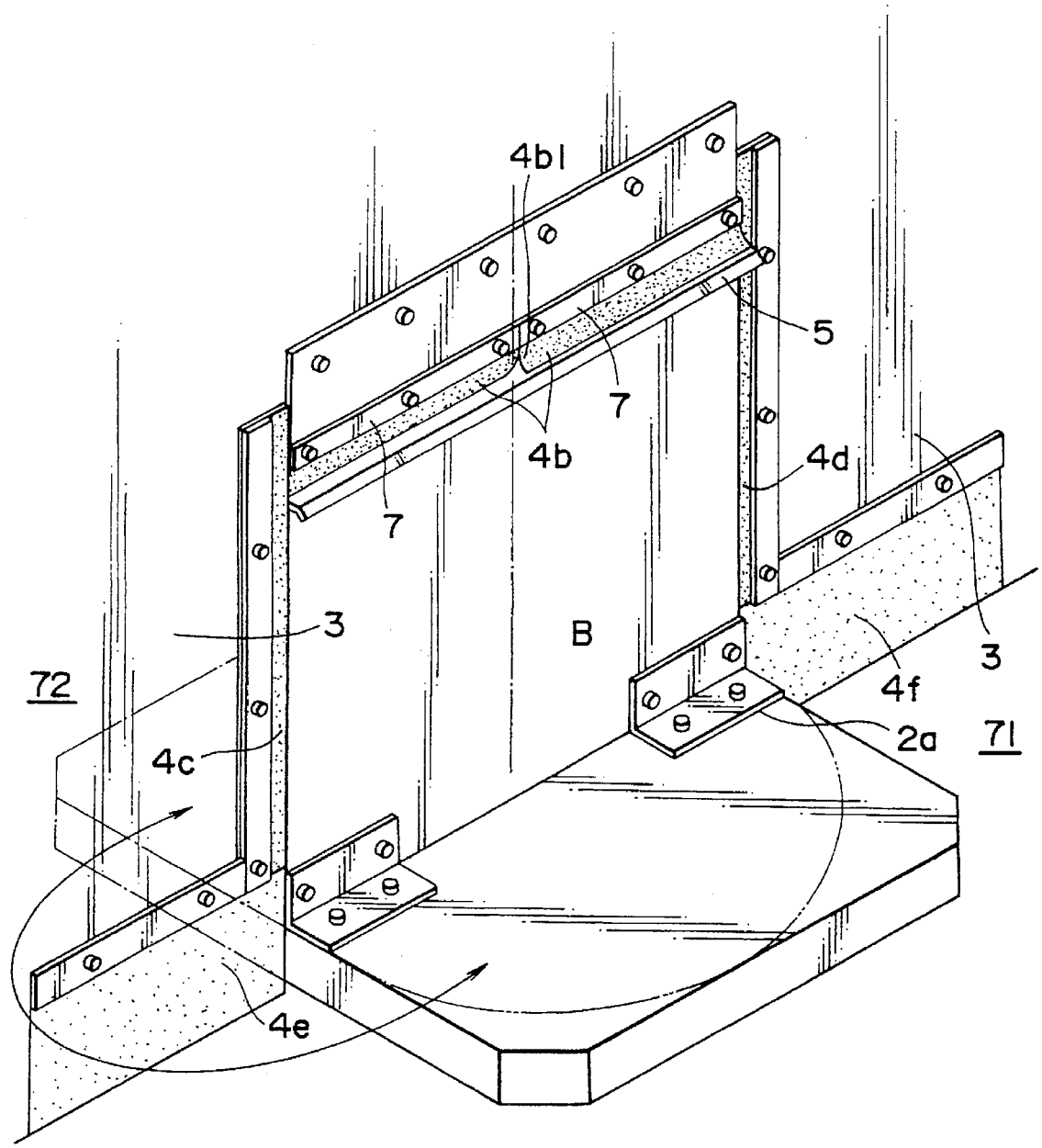
FIG. 8 is a perspective view of an embodiment of a splash guard according to the invention.

FIG. 8 is a perspective view of the turntable 1 with the splash guard 4, seen from the opposite side of FIG. 4. Resilient side flaps 4c and 4d are placed on the left and right sides of the opening 3a, extending slightly beyond the side surfaces of the panel 2, while resilient skirting flaps 4e and 4f are placed at the lower portion of the partition 3. The flaps 4c through 4f isolate the machining station 71 on left and right sides, and at the bottom of the partition 3.

The operation of the splash guard may be described with reference to FIGS. 3 and 4. As shown in FIG. 3, a workpiece is placed in the position W1 on the turntable 1. In order to machine the workpiece at position W1, the turntable 1 is rotated by 180 degrees to place the workpiece at the position W1', shown by a phantom line. As the turntable 1 rotates between positions, the wipers 4a and 4b are first released as the roof plate 5 rotates away from them, and then deformed at the ends thereof to wipe and seal against the top surface of the roof plate 5 as the roof plate 5 again swings into contact with the wipers 4a and 4b. The machining station 71 is thereby isolated.

When machining of the workpiece, now at position W1', is completed, an unmachined workpiece is placed at position W1, and the positions of the two are exchanged by rotating the turntable 1 by 180 degrees. The wipers 4a and 4b are again released and resealed during this rotation. The machined workpiece is removed from the turntable 1, an unfinished workpiece is placed at position W1, and the process is repeated indefinitely. In this manner, unmachined and machined workpieces can be exchanged between the machining station 71 and loading station 72 by the turntable 1, while the wipers 4a and 4b, as well as the flaps 4c through 4f, keep the machining station 71 isolated when machining is performed.

The splashing of the cutting fluid and the escape of debris from the machining station 71 are prevented by the panel 2, the partition 3, wipers 4a and 4b, the roof portion 5, and the flaps 4c through 4f. Particularly, since the double wipers 4a, 4b are staggered, any splashing or debris that passes through the split in one of the wipers 4a or 4b is shielded by a blocking face of the remaining one.

Furthermore, since the wipers 4a and 4b are resilient, and initially contact the roof plate 5 at the sloped portions thereof, the contact, and subsequent deformation of the wipers 4a and 4b, are both quiet and relatively gentle. Thus, the lifetime of the wipers 4a and 4b is enhanced, and the operation is quiet.

What is claimed is:

1. A splash guard for a machine tool, said splash guard comprising:
    a rotatable horizontal turntable for rotating and exchanging a workpiece between a loading and a machining station of said machine tool;
    a vertical panel perpendicularly fixed to said turntable to rotate with said turntable, said panel separating said turntable into two exchanger platforms rotatable between said loading and machining stations to exchange said workpiece;
    a vertical partition surrounding said panel for separating said loading station from said machining station, wherein said panel is rotatable to align with said partition and to form a gap between a top surface of said panel and an internal horizontal surface of said partition when aligned; and
    at least two resilient wipers fixed to said partition, each of said resilient wipers extending across said gap, parallel to one another and facing one another, and both of said resilient wipers being capable of simultaneously resiliently contacting the entire length of said top surface of said panel to seal said gap.

2. The splash guard according to claim 1,
    wherein each of said resilient wipers is vertically divided near a center portion thereof into two portions by a split extending towards said top surface of said panel, and
    wherein said splits are horizontally offset from each other along the length of said resilient wipers, so that each split is opposite a blocking face of the opposing resilient wiper.

3. The splash guard according to claim 2,
    wherein the axis of rotation of said panel is coplanar with said partition, and perpendicular to said internal horizontal surface of said partition.

4. The splash guard according to claim 3,
    wherein said splits are provided on opposing sides of said axis of rotation of said panel.

5. The splash guard according to claim 3,
    wherein both of said resilient wipers extend in a general direction of said panel by a predetermined amount more than the distance to said top surface of said panel when said panel is rotated to an unaligned position.

6. The splash guard according to claim 5, further comprising:
    a horizontal roof portion provided to said top surface of said panel,
    wherein said horizontal roof portion is wider than a thickness of said panel, and wider than the distance between said resilient wipers.

7. The splash guard according to claim 6,
    wherein said horizontal roof portion includes a portion sloping away from said resilient wipers, for allowing gradual contact of said resilient wipers to said horizontal roof portion.

8. The splash guard according to claim 2,
    wherein each of said two portions of each of said two resilient wipers is released from contact with said panel and resealed in contact with said panel with every 180 degree rotation of said turntable.

9. The splash guard according to claim 2, further comprising:
    a bifurcating arm supported by said partition, said bifurcating arm having two parallel plate portions extending from said partition, and wherein one of said resilient wipers is affixed to each of said two parallel plate portions.

10. The splash guard according to claim 6, further comprising:
    resilient side flaps extending from said partition to said panel, said side flaps extending across side gaps between vertical surfaces of said partition parallel to said axis of rotation of said panel and side surfaces of said panel,
    wherein said resilient side flaps close said side gaps when said panel is rotated to be coplanar with said partition.

11. The splash guard according to claim 10,
    wherein said turntable is rectangular, and
    wherein said splash guard further comprises resilient skirting flaps extending vertically from said partition into a rotation sweep of said rectangular turntable, and arranged to flex to allow said rectangular turntable to rotate, and to separate said machining station from said loading station when said panel is coplanar with said partition.

12. A splash guard for a machine tool, said splash guard comprising:
    a vertical stationary partition having a rectangular opening formed therein, said rectangular opening having an internal horizontal surface and internal vertical surfaces;
    a vertical rotatable panel having a rotation axis coplanar with said stationary partition and perpendicular to said internal horizontal surface, said rotatable panel having a top surface parallel to and forming a gap with said internal horizontal surface;

a first resilient wiper fixed to said internal horizontal surface; and a second resilient wiper fixed to internal horizontal surface, parallel to and facing said first resilient wiper, wherein both of said first and second resilient wipers extend across the entire length of said internal horizontal surface and across said gap, and are capable of resiliently contacting said top surface of said panel to seal said gap.

13. The splash guard according to claim 12, wherein each of said first and second resilient wipers is vertically divided near a center portion thereof into two portions by a split extending toward said top surface of said panel, and said splits are horizontally offset from each other along the length of said wipers, so that each split is opposite a blocking face of the facing wiper.

14. The splash guard according to claim 13 wherein said splits are provided on opposing sides of said axis of rotation of said panel.

15. The splash guard according to claim 12, wherein both of said first and second resilient wipers extend in a general direction of said panel by a predetermined amount more than the distance to said top surface when said panel is rotated to an unaligned position.

16. The splash guard according to claim 12, further comprising:

a horizontal roof portion provided to said panel top surface, wherein said horizontal roof portion is wider than a thickness of said panel, and wider than the distance between said first and second resilient wipers.

17. The splash guard according to claim 16, wherein said horizontal roof portion includes a portion sloping away from said first and second resilient wipers, for allowing gradual contact of said resilient wipers to said horizontal roof portion.

18. The splash guard according to claim 12, wherein each of said two portions of each of said two resilient wipers is released from contact with said panel and resealed in contact with said panel with every 180 degree rotation of said panel.

19. A splash guard for a machine tool, said splash guard comprising:

a partition separating a first and second area of said machine tool, and having a rectangular opening formed therein;

a rectangular panel provided in said rectangular opening, said rectangular panel being rotatable within said rectangular opening;

a pair of wiper members, opposing each other and blocking said opening from said partition to said rectangular panel, each of said wiper members being split to allow said rectangular panel to rotate, and said splits being offset from each other so that each of said splits is blocked by an unsplit portion of the opposing wiper.

* * * * *